United States Patent [19]

Gaudioso

[11] 4,382,264

[45] May 3, 1983

[54] MAGNETIC IMAGING TRANSFER PROCESS

[75] Inventor: Stephen L. Gaudioso, Webster, N.Y.

[73] Assignee: Xerox Corporation, Stamford, Conn.

[21] Appl. No.: 200,232

[22] Filed: Oct. 24, 1980

[51] Int. Cl.$^3$ .............................................. G01D 15/12

[52] U.S. Cl. .................................... 346/74.4; 346/74.2

[58] Field of Search .................... 346/74.2, 74.4, 74.7, 346/153.1, 74.6; 358/301, 302; 355/3 TR; 360/55, 57, 59; 430/33, 39, 98

[56] References Cited

U.S. PATENT DOCUMENTS

| | | | |
|---|---|---|---|
| 3,493,412 | 2/1970 | Johnston et al. | 430/120 |
| 3,555,557 | 1/1971 | Nacci | 346/74.4 |
| 3,852,525 | 12/1974 | Ichioka et al. | 358/301 |
| 3,987,491 | 10/1976 | Nelson | 346/74.2 |
| 4,068,239 | 1/1978 | Nelson | 346/74.7 |

*Primary Examiner*—Richard A. Wintercorn
*Assistant Examiner*—Thomas H. Tarcza
*Attorney, Agent, or Firm*—E. O. Palazzo

[57] ABSTRACT

Magnetic imaging method wherein a latent magnetic image is created on a magnetizable imaging member comprising a base or web containing a magnetizable component. After development of the latent image with a magnetic toner composition, the developed image is transferred by pressure contact to a receiving substrate and fixed thereto. The receiving substrate comprises a permanent member which has been treated with a binder and a crystalline plasticizer. The receiving substrate provides substantially improved efficient transfer of the toner particles from the imaging member to the receiving substrate.

8 Claims, No Drawings

MAGNETIC IMAGING TRANSFER PROCESS

This invention relates to magnetic imaging and, more particularly, to an improved method of pressure-transferring images from a developed reflex imaging member.

As disclosed in U.S. Pat. No. 3,555,557, it is known to provide a process of reflex thermomagnetic recording by premagnetizing a magnetic recording member having a support transparent to light and particulate magnetic material opaque to light dispersed in discrete areas of the support. A document to be copied is placed in copying relationship with the recording member and light is directed through the recording member to the document and back to the recording member by imagewise reflection from the document. The light has an intensity sufficient to imagewise raise the temperature of the magnetic material in the recording member above the Curie temperature of the magnetic material and imagewise demagnetize it. The formed latent magnetic image may be read out repeatedly by such means as magneto-optic read-out, or the magnetic image may be treated with a magnetic ink or magnetic toner particles which adhere magnetically to the magnetized portions of the recording member. The magnetic ink or magnetic toner is then transferred to paper or suitable substrate to form a copy of the original document.

It is also known per U.S. Pat. No. 3,845,306 to produce a magnetic image of an original by applying to a uniformly premagnetized surface a thermal image wherein the temperature of certain portions exceeds the Curie point. Such magnetic images can be converted into powder images by utilizing a magnetic toner. it is further known to subject a layer of magnetizable toner to the action of an external magnetic field and to simultaneously expose onto the magnetizable toner a thermal image wherein the temperature of certain portions exceeds the Curie point. This brings about a selective removal or transfer of pulverulent toner so that the residual toner or the removed toner forms a powder image. It has also been proposed to bring a magnetic layer in contact with a control layer wherein certain portions are heated above the Curie point to thus provide on the magnetic layer a permanent magnetic image of the original.

After formation, the latent magnetic image may be developed, that is, made visible by contact with magnetic marking material such as a magnetic toner composition. Subsequent to development of the latent magnetic image, it is usually desirable to transfer the toner image from the magnetic imaging member to a permanent substrate such as paper. For this operation, there are basically two methods used in magnetographic printing. One method is by electrostatic means such as employing a corona device, and the other is pressure transfer. It has been found that pressure transferred images usually exhibit higher resolution than corona transferred images and offer a fusing advantage when fixed by flash or heat/pressure methods. High transfer efficiencies are also desirable when a wide variety of transfer substrates such as calendered papers, clay papers, and assorted plastics are used in the imaging process. However, most magnetic toner materials exhibit incomplete release or transfer from a magnetic imaging member, especially when using low transfer pressures. Previous attempts to pressure transfer developed dry magnetic toner images from a reflex magnetic imaging member to plain paper substrates have been notably unsuccessful. The transfer efficiency for nearly all toners has been less than approximately 75%, resulting in a significant amount of toner being impacted on the imaging member. This, in turn, had to be mechanically cleaned from the imaging member surface before reexposure and/or subsequent development were carried out. In addition, it has been noted that significant abrasion, i.e., removal of the stripewise magnetic coating from its grooves and scratching of the transparent areas occurred on the imaging member as a result of the transfer process and the necessary post-transfer cleaning step thus rendering certain areas of the member useless for further imaging.

PRIOR ART STATEMENT

U.S. Pat. Nos. 3,987,491 and 4,068,239 relate to magnetic image transfer and imaging apparatus. Briefly, these patents are directed to magnetic toner imaging in which a magnetic image is formed on a chromium oxide and resin binder sheet. The magnetic image is then transferred to a drum having a layer of nickel cobalt, developed with toner, an then pressure-transferred therefrom to a receiving sheet. U.S. Pat. No. 3,852,525 is similar using a metallic permalloy surface as the printing member. U.S. Pat. No. 3,493,412 discloses the transfer of a toner image to a solid crystalline plasticizer coated receiving surface followed by heat fusion of the toner image.

Despite the apparent simplicity and inherent economical advantage of utilizing pressure for transfer of toner images, there are certain disadvantages associated with it. Since pressure is employed, when the adhesive forces of the toner to the imaging member are strong, the toner may not be removed therefrom resulting in poor transfer efficiency and, consequently, poor copy quality. Further, when toner image transfer efficiency is poor, toner becomes impacted on the imaging member and abrasion or other mechanical damage to the imaging member results. Therefore, there is a need for an improved method of transferring toner images from an imaging member to a receiving substrate.

It is an object of this invention to provide an improved method of transferring toner images from a magnetic imaging member to a receiving substrate.

It is a further object of this invention to provide a method of pressure-transferring toner images from a reflex imaging member to a receiving substrate wherein essentially 100% of the toner is transferred.

It is still a further object of this invention to provide a method of transferring toner images from a magnetic imaging member to a receiving substrate wherein substantially reduced pressures may be employed.

It is yet another object of this invention to provide improved toner image receiving substrates for magnetic imaging.

These and other objects of this invention will be apparent from a reading of the following description of the invention.

In accordance with the present invention, there is provided an improved method of transferring developed latent magnetic images obtained in reflex thermoremanent magnetic imaging whereby superior duplicated images are produced. More specifically, it has been found that a substantially improved method of transferring developed toner images from a magnetic imaging member to a permanent substrate is provided when the receiving member comprises a specially treated bond-like paper. The novel treatment of otherwise ordinary bond paper comprises the addition to the paper of a suitable binder such as a styrene-butadiene latex and a plasticizer during its manufacture. Unlike coated papers, the treated receiving substrates of this invention do not suffer from the usual deficiencies of being stiff or having a stiff feel, coining, having a chalky surface texture, and being difficult to write upon. More importantly, it has been found that, when employed in pressure transfer of developed toner images from a magnetic imaging member, such treated receiving papers repeatedly enable essentially 100% toner transfer thereto, and at pressures of about 35 pounds or less per lineal inch. The improved results obtained are clearly discernible by enhanced solid area and line copy density and resolution in the transferred toner images. In addition, no observable damage is done to the magnetic imaging member. After pressure-transfer, the toner images are found to be adequately bound to the receiving substrates to permit routine handling and use. Where desired, an additional degree of image protection may be imparted thereto via known toner fixing methods such as radiant heat, solvent, and flash lamp.

Typical suitable fixing methods include heating the toner in the developed image to cause the resins thereof to at least partially melt and become adhered to the receiving member, the application of pressure to the toner being optionally accomplished with heating such as the use of a heated roller, solvent or solvent vapor to at least partially dissolve the resin component of toner, or any combination of the above.

In operation the improved imaging method of this invention comprises the steps of thermally erasing and subsequently magnetizing a reflex magnetic imaging member with a D.C. magnetic field at an exposure of at least about 800 gauss, placing a document to be copied in contact with the imaging member, directing light through the imaging member to the document to be copied and back to the imaging member by imagewise reflection from the document to expose the magnetic material in the imaging member and imagewise demagnetize the imaging member, separating the document to be copied from the imaging member, and contacting the imaging member with magnetizable toner paticles which have been partially premagnetized so that the toner particles retain a residual internal magnetic field. After development of the latent magnetic image, the imaging member surface bearing the toner image is contacted with the treated paper of this invention and both are passed through the nip of a pair of stainless steel rolls each having a diameter of about 3 inches loaded at about 35 pounds or less per lineal inch. It is found that virtually 100% of the toner particles originally present on the imaging member are transferred to the treated paper and that re-development and retransfer can be accomplished repeatedly without any post-transfer clean-up being required of the imaging member. In addition, there is no observable damage to a reflex imaging member as a result of repeated transfers. Copy quality of the transferred image is excellent with very low perceptible background, solid image areas are dense, and resolution is at least 6 line pairs per millimeter in both directions.

The treated receiving members of this invention may comprise any permanent substrate to which a suitable binder and a crystalline plasticizer have been made part of the substrate composition during the manufacture of the substrate. Suitable binders include styrene-butadiene latex, polyvinyl alcohol, starch, clay, acrylic latex, polyvinyl acetate, carboxy-methyl cellulose, polyvinyl pyrrolidone, soy proteins, casein, and mixtures thereof. Suitable crystalline plasticizers include ethylene glycol dibenzoate, diphenylphthalate, dimethyl isophthalate, glycerol tribenzoate, dicyclohexyl phthalate, diphenyl isophthalate, and blends thereof.

Any suitable receiving member may be treated in accordance with this invention. For example, sheets, webs and planks may be treated or impregnated with the binder and plasticizer materials of this invention. The receiving surface may be composed of any suitable organic material, inorganic material, or mixtures thereof.

The binder and plasticizer composition may be applied to the receiving member by any conventional method such as spraying, electrostatic deposition, dipping, fluidized bed coating, brushing, or roll coating. Further, the binder and plasticizer may be added to the receiving member in any suitable in any suitable manner prior to, during, or subsequent to the manufacture of the receiving surface. In addition, the and plasticizer may be applied alone or in combination with other materials as a powder, dispersion, solution, latex, vapor, emulsion, or melt to paper during or after the papermaking process. Optimum results have been obtained when the plasticizer is applied admixed with the binder because the problem of dust contamination is eliminated. Any of the conventional additives such antioxidants, emulsifiers, brighteners, solvents, surfactants, suspending agents, antifoam agents, coloring agents and fillers may be employed with the binder and plasticizer. Surprisingly, toner images formed on receiving members treated with the binder and plasticizer mixture are more dense than toner images formed on untreated receiving surfaces. Additionally, paper sheets treated with the binder and plasticizer mixture lie flatter after toner fusing than untreated paper.

The receiving member may comprise organic and/or inorganic fibers such as cellulose, modified cellulose, polymeric resin, glass, and asbestos fibers. The binder and plasticizer may be added to paper at any stage of the paper-making process. Surface coatings containing at least about 0.4 pound of binder and plasticizer per 1000 square feet of paper will markedly improve toner transfer although smaller amounts may also have some effect. When the binder and plasticizer materials are incorporated into the paper prior to sheet formation, e.g., in the beater, or subsequent to web formation, e.g., by impregnation, proportionately more binder and plasticizer is necessary in order to maintain a sufficient quantity of these materials at the surface of the paper sheet. Excellent results are obtained when from about 1.0 to about 2.0 pounds of binder and plasticizer per 1000 square feet is applied to receiving members as a surface treatment. The ratio of binder to plasticizer to be employed may be about equal parts of each, however, the amount of binder should be at least 20 parts per 100 parts of binder and plasticizer material.

Any suitable magnetic imaging member may be employed in the process of this invention. Typical magnetic imaging members comprise a film, base, or web containing a magnetizable material such as a magnetic tape having a magnetic recording surface. For example, the imaging member may comprise a magnetic tape having a chromium dioxide recording surface sold under the tradename Crolyn ® by E. I. duPont Company, Wilmington, Del. Especially preferred as magnetic imaging members are those having a discretely patterned magnetic recording surface as described in U.S. Pat. Nos. 3,522,090; 3,554,798; and 3,555,557, all assigned to the E. I. duPont Company, Wilmington, Del. The imaging member is uniformly magnetized in a direction parallel to the preferred or "easy" magnetic axis.

After magnetization, the imaging member is held in contact by suitable means such as by vacuum with an original document to be copied and exposed with a suitable light source such as a xenon lamp at a flash energy of between about 1.5 joules and about 8.5 joules per square inch for between about 0.1 and about 10.0 milliseconds. The light source energy must be sufficient to raise the temperature of the magnetic particles in the imaging member to or above their Curie temperature. Chromium dioxide has a relatively low Curie temperature of about 125° C., and has a relatively high coercivity and high remanence. The remaining magnetized image areas form a latent magnetic image and attract the toner particles to form a visible image. The magnetically attractable component in the toner particles may be present in the amount of between about 20% by weight and about 90% by weight based on the weight of the toner composition. The developed image is then contacted with the receiving member of this invention to which pressure is applied and the image is thereby transferred and fixed thereto. Typically, the image transfer means comprises at least a pair of transfer rollers or a transfer roller and an idler roller.

The magnetizable toner composition utilized for development of the magnetic latent image preferably comprises a resinous material that can be fused to the receiving medium when brought into contact therewith under pressure. It will be understood that additional fixing need not occur at the transfer station but can optionally be provided downstream. In that case, a separate fusing station having conventional fusing means can be employed. While the receiving medium may be fed from a supply roll, it will be appreciated that the receiving medium may be provided in any form, e.g., sheet, strip, web, etc.

Subsequent to transfer of the toner from the latent magnetic image to the receiving medium, the imaging member may be passed adjacent to an erase means suitably energized by a power source prior to re-magnetization. Further, the imaging member may be provided in the form of an endless web or tape traveling over rollers.

Any suitable development technique can be employed for the development of the magnetic latent image residing on the imaging member. Typical suitable development methods include cascade development, powder cloud development, and flood development. It will be appreciated, of course, that electrostatic transfer techniques may be employed. In that case, the toner utilized at the development station comprises an electrostatically attractable component.

Any suitable magnetizable toner composition may be employed in the imaging method of this invention. Typical magnetizable toner compositions include an electrostatitally attractable component such as gum copal, gum sandarac, cumarone-indene resin, asphaltum, gilsonite, phenolformaldehyde resins, resin-modified phenolformaldehyde resins, methacrylic resins, polystyrene resins, epoxy resins, polyester resins, polyamide resins, polyethylene resins, vinyl chloride resins, and copolymers or mixtures thereof. The particular toner material to be employed may be selected depending upon its triboelectric properties where such is a consideration. However, the preferred toner materials are those having a relatively soft, in terms of yield stress, resin component such as polyethylene, polyethylene vinyl acetate, carnauba wax, polyhexamethylene sebacate, polyethylene glycol, and blends or copolymers of these materials with other resins as they provide excellent fixing properties. Among the patents describing toner compositions are U.S. Pat. No. 2,659,670 issued to Copley; U.S. Pat. No. 2,753,308 issued to Landrigan; U.S. Pat. No. 3,070,342 issued to Insalaco; U.S. Pat. No. Re. 25,136 to Carlson, and U.S. Pat. No. 2,782,288 issued to Rheinfrank et al. These toners generally have an average particle diameter in the range substantially 5 to 30 microns, however, 5 to 15 microns is preferred.

Any suitable pigment or dye may be employed as a colorant for the toner particles. Colorants for toners are well known and are, for example, carbon black, black dye such as Nigrosine dyes, aniline blue, Calco Oil Blue, chrome yellow, ultramarine blue, Quinoline Yellow, methylene blue chloride, Monastral Blue, Malachite Green Oxalate, lampblack, Rose Bengal, Monastral Red, Sudan Black BN, and mixtures thereof. The pigment or dye should be present in the toner in a sufficient quantity to render it highly colored so that it will form a clearly visible image on a recording member.

Any suitable magnetic or magnetizable substance may be employed as the magnetically attractable component for the toner particles. Typical magnetically attractable materials include metals such as iron, nickel, cobalt, ferrites containing nickel, zinc, cadmium, barium, and manganese; metal oxides such as $CrO_2$, $\gamma$-$Fe_2O_3$ and $Fe_3O_4$ or magnetite and hematite; metal alloys such as nickel-iron, nickel-cobalt-iron, aluminum-nickel-cobalt, copper-nickel-cobalt, and cobalt-platinum-manganese. Preferred for the instant process are magnetite particles as they are black in color, low cost and provide excellent magnetic properties. The magnetic component particles may be of any shape and any size which results in magnetic toner particles having excellent transfer properties. Generally, the magnetic component particles may range in size from about 0.02 micron to about 1 micron. A preferred average particle size for the magnetic component particles is from about 0.1 to about 0.5 micron average diameter. The magnetic component particles may be any shape, including acicular or polyhedral.

The following examples further define and describe the magnetic imaging method and receiving members of the present invention and methods of utilizing them to develop latent magnetic images. Parts and percentages are by weight unless otherwise indicated.

EXAMPLE I

A magnetizable toner composition was prepared as follows. To about 38 pounds of a solvent mixture comprising about 4 parts of chloroform and about 6 parts of hexane was added about 0.7 pounds of polyhexamethylene sebacate, a linear polyester, and about 1.3 pounds of an uncoated magnetite pigment available under the tradename MAPICO BLACK from the Columbian Division of Cities Service, Inc., Akron, Ohio. The polyester was prepared by bulk polymerizing a mixture comprising about 38 parts of 1,6-hexanediol and about 62 parts of sebacic acid in the presence of about 0.1 part/hundred of lead acetate. The mixture was heated and the temperature maintained at about 425° F. until the reaction was substantially complete. The polyester product had an intrinsic viscosity of about 0.8 deciliter per gram by measurements in toluene at about 25° C.

The dispersion was milled for about 30 minutes at ambient temperature and then transferred to a gravity feed kettle. The mixture was fed onto a 2 inch diameter spinning disc atomizer at a rotation speed of about 50,000 r.p.m. using a commercial spray dryer. The feed rate was about 200 ml. per minute. The inlet drying temperature was held at about 180° F. The spray-dried particles were passed through a cyclone separator and collected in a bell jar. After drying overnight in a vacuum oven, the particles were screened through an 84 $\mu$m screen to remove agglomerates. The spray-dried toner particles were found to have a volume median diameter of about 12 microns and a geometric standard deviation of about 1.43. The number median diameter of the toner particles was about 5.7 microns with a geometric standard deviation of about 1.74.

The toner composition comprised about 65 parts of magnetite and about 35 parts of polyhexamethylene sebacate. The toner material was dry-blended with about 0.4 parts by weight of a flow agent additive commercially available under the tradename Silanox® 101 from Cabot Corporation, Boston, Mass., to provide a free-flowing, magnetic developer material. Silanox® 101 is a hydrophobic fumed silicon dioxide.

A segment of magnetizable reflex imaging material obtained from the DuPont Company was thermally erased and subsequently magnetized with a D.C. field having a magnetic strength of about 800 gauss. The uniformly premagnetized imaging member was held in contact by vacuum with an original to be copied comprising a sheet of white paper containing black line and solid area print thereon and exposed with a xenon flash lamp at an energy of about 4 joules per square inch for about 1.0 millisecond. The original to be copied was separated from the imaging member and the imaging member was flooded with the foregoing developer composition to develop the latent magnetic image formed on the imaging member. The developer composition was partially premagnetized by exposure to a D.C. field having a magnetic strength of about 1000 gauss. Excess toner was removed by gentle tapping of the imaging member. The imaging member with the toner image was placed in contact with a receiving member of this invention. The receiving member comprised ordinary Xerox® 1024 bond paper to which a styrene-butadiene latex and plasticizer had been added during the surface sizing operation in the manufacture of the paper. The styrene-butadiene latex and plasticizer composition was applied to the treated receiving sheets as an aqueous dispersion by means of a smooth metal reverse roll in a Dietzco-Dixon Pilot Coater followed by doctoring with a reverse rotating No. 4 wire-wound rod and finally dried by heated air. The styrene-butadiene latex and plasticizer composition contained about 1080 parts ethylene glycol dibenzoate, 14.4 parts polyvinyl pyrrolidone, 340 parts butadiene-styrene latex (Dow 636, 48% solids), 0.14 part brightener (Calcofluor White CBP), 5 parts ammonium hydroxide (28%), 7.2 parts polymerized sodium salt of an alkyl naphthalene sulfonic acid (Daxad 11), and 1083 parts water to provide a treating concentration, of about 0.4 pounds per 1,000 ft.$^2$ of paper sheet.

The imaging member and the receiving member were simultaneously passed through the nip of a pair of stainless steel rollers each having a diameter of about 3 inches loaded at a pressure of about 35 pounds per lineal inch at a speed of about 5 inches/second. The receiving member was separated from the imaging member and, upon examination, it was found that virtually 100% of the toner originally present on the imaging member was transferred to the receiving member. The same magnetic tape segment was hand-developed without precleaning and again passed between the steel rolls at the aforementioned pressure and speed. The magnetic developer material was transferred to a second receiving sheet. This procedure was repeated until 10 prints were produced. Each print was evaluated for print density. The tape segment was examined for toner residue and toner film build-up. No change in the reflectance density of 1.4 was measured on either the first or tenth prints. No toner residue or film was visually observed on the tape indicating excellent toner transfer. No tape damage was observed.

EXAMPLE II

The procedure of Example I was repeated except that the receiving member comprised ordinary bond paper to which a styrene-butadiene latex and plasticizer had been added during the sizing operation in the manufacture of the paper as in Example I. The styrene-butadiene latex and plasticizer composition contained about 9818 parts of diphenylphthalate, 98 parts polyvinyl pyrrolidone, 2291 parts butadiene-styrene latex (Dow 636, 48% solids), 109 parts ammonium hydroxide (28%), 49 parts polymerized sodium salt of an alkyl naphthalene sulfonic acid (Daxad 11), 3415 parts Casein solution containing 373 parts Casein PMX, 1933 parts distilled water, 19 parts ammonium hydroxide (28%), and 7758 parts distilled water. The treating composition was applied at a concentration of about 0.4 pounds per 1,000 ft.$^2$ of paper sheet. The imaging member and the receiving member were simultaneously passed through the nip of a pair of stainless steel rollers each having a diameter of about 3 inches loaded at a pressure of about 35 pounds per lineal inch at a speed of about 5 inches/-second. The receiving member was separated from the imaging member and, upon examination, it was found that virtually 100% of the toner originally present on the imaging member was transferred to the receiving member. The same magnetic tape segment was hand-developed without precleaning and again passed between the steel rolls at the aforementioned pressure and speed. The magnetic developer material was transferred to a second receiving sheet. This procedure was repeated until 10 prints were produced. Each print was evaluated for print density. The tape segment was examined for toner residue and toner film build-up. No change in the reflectance density of 1.4 was measured on either the first or tenth prints. No toner residue or film was visually observed on the tape indicating excellent toner transfer. No tape damage was observed.

EXAMPLE III

A magnetizable toner composition was prepared as follows. To about 87.5 pounds of chloroform was added about 9.375 pounds of an uncoated magnetic pigment available under the tradename Pfizer magnetite MO4232 from Pfizer, Inc., of Easton, Pa., and about 3.125 pounds of a polyamide resin commercially available under the tradename Emerez 1552 from Emery Industries, Inc. of Cincinnati, Ohio. Emerez 1552 is a solid polyamide material derived from the reaction of a dimer acid with a linear diamine.

The dispersion was milled for about 30 minutes at ambient temperature and then transferred to a gravity feed kettle. The mixture was fed onto a spinning disc atomizer at a rotation speed of about 50,000 r.p.m. using a commercial spray dryer. The feed rate was about 200 ml. per minute. The inlet drying temperature was held at about 180° F. The spray-dried particles were passed through a cyclone separator and collected in a bell jar. After drying overnight in a vacuum oven, the particles were screened through an 84 $\mu m$ screen to remove agglomerates. The spray-dried toner particles were found to have a volume median diameter of about 13.3 microns and a geometric standard deviation of about 1.59. The number median diameter of the toner particles was about 5.2 microns with a geometric standard deviation of about 1.80.

The toner composition comprised about 75 parts by weight of magnetite and about 25 parts by weight of the polyamide. The toner material was dry-blended with about 0.4 parts by weight of a flow agent additive commercially available under the tradename Silanox ® 101 from Cabot Corporation, Boston, Mass., to provide a free-flowing, magnetic developer material. Silanox ® 101 is a hydrophobic fumed silicon dioxide.

A segment of magnetizable reflex imaging material obtained from the DuPont Company was thermally erased and subsequently magnetized with a D.C. field having a magnetic strength of about 800 gauss. The uniformly premagnetized imaging member was held in contact by vacuum with an original to be copied comprising a sheet of white paper containing black line and solid area print thereon and exposed with a xenon flash lamp at an energy of about 4 joules per square inch for about 1.0 milliseconds. The original to be copied was separated from the imaging member and the imaging member was flooded with the foregoing developer composition to develop the latent magnetic image formed on the imaging member. The developer composition was partially premagnetized by exposure to a D.C. field having a magnetic strength of about 1000 gauss. Excess toner was removed by gentle tapping of the imaging member. The imaging member with the toner image was placed in contact with a receiving member of this invention. The receiving member comprised ordinary bond paper to which a styrene-butadiene latex and plasticizer as in Example I had been added during the sizing operation in the manufacture of the paper. The imaging member and the receiving member were simultaneously passed through the nip of a pair of stainless steel rollers each having a diameter of about 3 inches loaded at a pressure of about 35 pounds per lineal inch at a speed of about 5 inches/second. The receiving member was separated from the imaging member and, upon examination, it was found that virtually 100% of the toner originally present on the imaging member was transferred to the receiving member. The same magnetic tape segment was hand-developed without precleaning and again passed between the steel rolls at the aforementioned pressure and speed. The magnetic developer material was transferred to a second receiving sheet. This procedure was repeated until 10 prints were produced. Each print was evaluated for print density. The tape segment was examined for toner residue and toner film build-up. No change in the reflectance density of 1.4 was measured on either the first or tenth prints. No toner residue or film was visually observed on the tape indicating excellent toner transfer. No tape damage was observed.

EXAMPLE IV

The procedure of Example III was repeated except that the receiving member comprised ordinary bond paper to which a styrene-butadiene latex and plasticizer as in Example II had been added during the sizing operation in the manufacture of the paper. The imaging member and the receiving member were simultaneously passed through the nip of a pair of stainless steel rollers each having a diameter of about 3 inches loaded at a pressure of about 35 pounds per lineal inch at a speed of about 5 inches/second. The receiving member was separated from the imaging member and, upon examination, it was found that virtually 100% of the toner originally present on the imaging member was transferred to the receiving member. The same magnetic tape segment was hand-developed without precleaning and again passed between the steel rolls at the aforementioned pressure and speed. The magnetic developer material was transferred to a second receiving sheet. This procedure was repeated until 10 prints were produced. Each print was evaluated for print density. The tape segment was examined for toner residue and toner film build-up. No change in the reflectance density of 1.4 was measured on either the first or tenth prints. No toner residue or film was visually observed on the tape indicating excellent toner transfer. No tape damage was observed.

EXAMPLE V

The procedure of Example I was repeated except that, after development of the latent magnetic image with the toner particles of Example I, the imaging member was contacted with a receiving member comprising ordinary Xerox ® 1024 bond paper which had not been treated as in Example I.

After separation of the receiving member from the imaging member, it was found that the toner transfer to the receiving member was less than approximately 75%. This procedure was repeated 10 times resulting in a significant amount of toner particles being impacted on the imaging member. This, in turn, had to be mechanically cleaned from the imaging member surface before re-exposure and/or subsequent development were carried out. In addition, it was noted that significant abrasion, i.e., removal of the stripewise magnetic coating from its grooves and scratching of the transparent areas occurred on the imaging member as a result of the transfer process and the necessary post-transfer cleaning step, and certain areas of the imaging member were rendered useless for further imaging.

EXAMPLE VI

The procedure of Example II was repeated except that, after development of the latent magnetic image with the toner particles of Example II, the imaging member was contacted with a receiving member comprising ordinary Xerox ® 1024 bond paper which had not been treated as in Example II.

After separation of the receiving member from the imaging member, it was found that the toner transfer to the receiving member was less than approximately 75%. This procedure was repeated 10 times resulting in a significant amount of toner particles being impacted on the imaging member. This, in turn, had to be mechanically cleaned from the imaging member surface before re-exposure and/or subsequent development were carried out. In addition, it was noted that significant abrasion, i.e., removal of the stripewise magnetic coating from its grooves and scratching of the transparent areas occurred on the imaging member as a result of the transfer process and the necessary post-transfer cleaning step, and certain areas of the imaging member were rendered useless for further imaging.

EXAMPLE VII

The procedure of Example III was repeated except that, after development of the latent magnetic image with the toner particles of Example III, the imaging member was contacted with a receiving member comprising ordinary Xerox ® 1024 bond paper which had not been treated as in Example III.

After separation of the receiving member from the imaging member, it was found that the toner transfer to the receiving member was less than approximately 75%. This procedure was repeated 10 times resulting in a significant amount of toner particles being impacted on the imaging member. This, in turn, had to be mechanically cleaned from the imaging member surface before re-exposure and/or subsequent development were carried out. In addition, it was noted that significant abrasion, i.e., removal of the stripewise magnetic coating from its grooves and scratching of the transparent areas occurred on the imaging member as a result of the transfer process and the necessary post-transfer cleaning step, and certain areas of the imaging member were rendered useless for further imaging.

EXAMPLE VIII

The procedure of Example IV was repeated except that, after development of the latent magnetic image with the toner particles of Example IV, the imaging member was contacted with a receiving member comprising ordinary Xerox ® 1024 bond paper which had not been treated as in Example IV.

After separation of the receiving member from the imaging member, it was found that the toner transfer to the receiving member was less than approximately 75%. This procedure was repeated 10 times resulting in a significant amount of toner particles being impacted on the imaging member. This, in turn, had to be mechanically cleaned from the imaging member surface before re-exposure and/or subsequent development were carried out. In addition, it was noted that significant abrasion, i.e., removal of the stripewise magnetic coating from its grooves and scratching of the transparent areas occurred on the imaging member as a result of the transfer process and the necessary post-transfer cleaning step, and certain areas of the imaging member were rendered useless for further imaging.

In summary, it has been found and shown that the imaging method of this invention provides significantly improved developed images obtained in reflex thermomagnetic recording systems. More specifically, the treated receiving members of this invention provide improved abhesive properties with respect to toner particles from a magnetic imaging member when they are pressure transferred to the receiving substrate resulting in surprisingly substantially improved efficient transfer of the toner image to the receiving substrate. In addition, the receiving members of this invention allow the use of lower developed image transfer pressures when employed in the pressure transfer of tone images from a magnetic imaging member to a permanent substrate. Further advantages of this invention include elimination of the need for a corotron in the transfer system; no solvent or contact cleaning of the imaging surface is required after toner transfer; higher image resolution is obtained; and less machine power is necessary. Still further, the imaging process of this invention enables the simultaneous transfer and pressure fixing of developed magnetic images.

I claim:

1. A magnetic imaging method comprising the steps of:
   (a) creating a latent magnetic image on a magnetizable imaging member comprising a base containing a magnetizable component;
   (b) developing said latent magnetic image with toner having magnetic or magnetizable properties; and
   (c) transferring the developed image by pressure contact from said magnetizable imaging member to a receiving substrate wherein said receiving substrate has been treated with a binder selected from the group consisting of a styrene-butadiene latex, polyvinyl alcohol, starch, clay, acrylic latex, polyvinyl acetate, carboxymethyl cellulose, polyvinyl pyrrodidone, soy proteins, casein, and mixtures thereof, and a plasticizer, selected from the group consisting of ethylene glycol dibenzoate, diphenylphthalate, dimethyl isophthalate, glycerol tribenzoate, dicyclohexyl phthalate, diphenyl isophthalate, and mixtures thereof.

2. A magnetic imaging method in accordance with claim 1 wherein said binder and plasticizer is present in the amount of at least about 0.4 pound per 1000 square feet of said receiving substrate.

3. A magnetic imaging method in accordance with claim 1 wherein said binder is present in the amount of at least 20 parts per 100 parts of said binder and said plasticizer.

4. A magnetic imaging method in accordance with claim 1 wherein said receiving substrate comprises paper.

5. A magnetic imaging method in accordance with claim 1 wherein said toner comprises a thermoplastic resin and a magnetically attractable component.

6. A magnetic imaging method in accordance with claim 1 wherein said pressure contact is at about 35 pounds or less per lineal inch.

7. A reflex thermoremanent magnetic imaging method comprising the steps of:
   (a) erasing and subsequently magnetizing a reflex magnetic imaging member with a D.C. magnetic field at an exposure of at least about 800 gauss;
   (b) placing a document in copying contact with said imaging member;
   (c) directing light through said imaging member to said document and back to said imaging member by imagewise reflection from said document to expose the magnetic material in said imaging member and imagewise demagnetize said imaging member to form a latent magnetic image;
   (d) separating said document from said imaging member;
   (e) contacting said imaging member with partially premagnetized magnetizable toner particles to develop said latent magnetic image; and
   (f) transferring the developed image by pressure contact from said imaging member to a receiving substrate wherein said receiving substrate has been treated with a binder selected from a group consisting of a styrene-butadiene latex, polyvinyl alcohol, starch, clay, acrylic latex, polyvinyl acetate, carboxymethyl cellulose, polyvinyl pyrrolidone, soy proteins, casein, and mixtures thereof and a plasticizer, selected from the group consisting of ethylene glycol dibenzoate, diphenylphthalate, dimethyl isophthalate, glycerol tribenzoate, dicyclohexyl phthalate, diphenyl isophthalate, and blends thereof.

8. A reflex thermoremanent magnetic imaging method in accordance with claim 7 wherein said receiving substrate comprises paper.

* * * * *